United States Patent
Lu et al.

(10) Patent No.: US 11,268,734 B2
(45) Date of Patent: Mar. 8, 2022

(54) FLEXIBLE INSULATED AIR DUCT AND MODULAR FLEXIBLE INSULATED AIR-DUCT SYSTEM

(71) Applicant: DURKEESOX (WUHAN) AIR DISPERSION SYSTEM CO., LTD., Hubei (CN)

(72) Inventors: Biao Lu, Hubei (CN); Ze Du, Hubei (CN)

(73) Assignee: DURKEESOX (WUHAN) AIR DISPERSION SYSTEM CO., LTD., Hubei (CN)

( * ) Notice: Subject to any disclaimer, the term of this patent is extended or adjusted under 35 U.S.C. 154(b) by 155 days.

(21) Appl. No.: 16/499,867

(22) PCT Filed: Jun. 1, 2018

(86) PCT No.: PCT/CN2018/089666
§ 371 (c)(1),
(2) Date: Sep. 30, 2019

(87) PCT Pub. No.: WO2018/219355
PCT Pub. Date: Dec. 6, 2018

(65) Prior Publication Data
US 2020/0109874 A1    Apr. 9, 2020

(30) Foreign Application Priority Data

Jun. 2, 2017 (CN) .......................... 201720639719.9
Mar. 2, 2018 (CN) .......................... 201820293893.7

(51) Int. Cl.
*F16L 59/02* (2006.01)
*F24F 13/02* (2006.01)

(52) U.S. Cl.
CPC ........ *F24F 13/0263* (2013.01); *F16L 59/028* (2013.01); *F24F 13/0218* (2013.01); *F24F 13/0281* (2013.01)

(58) Field of Classification Search
CPC .................... F16L 59/028; F16L 59/14; F16L 59/021–025; F24F 13/0263; F24F 13/0218; F24F 13/0281
(Continued)

(56) References Cited

U.S. PATENT DOCUMENTS 2,756,172 A  *  7/1956  Kidd ...................... F16L 59/026
                                                        138/147
3,941,159 A  *  3/1976  Toll ....................... F16L 59/022
                                                        138/147

(Continued)

*Primary Examiner* — Patrick F Brinson
(74) *Attorney, Agent, or Firm* — Chun-Ming Shih; Lanway IPR Services

(57) ABSTRACT

Provided are a flexible insulated air duct and a modular flexible insulated air-duct system; the flexible insulated air duct includes an air-duct main body (1); the air-duct main body (1) includes an inner air-duct layer (5) and a heat-insulating layer (4) integrally formed on the inner air-duct layer (5); the inner air-duct layer (5) is arranged inside the heat-insulating layer (4), and the heat-insulating layer (4) is a rubber/plastic material. The modular flexible insulated air-duct system made by assembling a main air duct (7), a branched air duct (8), and a connecting air duct (9) may be rapidly connected on-site using a zip fastener to form an air-duct system having any configuration.

13 Claims, 9 Drawing Sheets

(58) Field of Classification Search
USPC .............................. 138/149, 128, 151, 156
See application file for complete search history.

(56) References Cited

U.S. PATENT DOCUMENTS

| | | | | |
|---|---|---|---|---|
| 6,148,867 | A * | 11/2000 | Matthews | B32B 3/30 |
| | | | | 138/149 |
| 6,286,876 | B1 * | 9/2001 | Jasperse | B64F 1/362 |
| | | | | 138/156 |
| D460,741 | S * | 7/2002 | Nakamura | D13/156 |
| 6,457,237 | B1 * | 10/2002 | Matthews | B32B 3/30 |
| | | | | 29/890.144 |
| 6,814,105 | B1 * | 11/2004 | Crim, Jr. | B32B 5/26 |
| | | | | 138/149 |
| 2002/0092577 | A1 * | 7/2002 | Vitoorapakorn | F16L 55/035 |
| | | | | 138/149 |
| 2004/0079431 | A1 * | 4/2004 | Kissell | F16L 59/026 |
| | | | | 138/149 |
| 2004/0238059 | A1 * | 12/2004 | Shaffer | F16L 59/026 |
| | | | | 138/149 |
| 2015/0114510 | A1 * | 4/2015 | Zettell | F16L 59/023 |
| | | | | 138/149 |
| 2018/0031268 | A1 * | 2/2018 | Lopez Belbeze | B32B 5/022 |

* cited by examiner

FLEXIBLE INSULATED AIR DUCT AND MODULAR FLEXIBLE INSULATED AIR-DUCT SYSTEM

TECHNICAL FIELD

The invention refers to the field of air-conditioning ventilation duct, in particular to a flexible insulation duct and a modular flexible insulation duct system.

BACKGROUND ART

The insulation duct is mostly used in cold and warm air conditioning engineering. According to the materials, the insulation duct comprises a iron sheet duct, a glass steel duct, a polyurethane duct, a phenolic duct, a polystyrene duct, a fiberglass duct, etc., most of which are rigid ducts, or the composite duct coated with aluminum foil on both sides of the insulation material layer, which has poor insulation effect and fire resistance, with easy air leakage, difficult assembling connection and replacement. The soft tube made of rubber or plastic alone cannot be used as a duct, which is easy to break, and cannot be assembled or hoisted.

In practical use, the structure of ducts varies with different application sites. Currently, different specifications of ducts are usually customized according to the actual situation of application sites.

However, the customized duct specifications are not uniform, and they are all non-standard parts, which cannot be prefabricated in advance. Production can only be carried out after the site size is measured and applied, which is not only large in manufacturing cost, but also inconvenient for packaging and transportation. In the installation and use, the installation must be carried out in accordance with the pre-arranged order, and the flexibility is poor. If there is any site measurement error before, it will cause a lot of losses.

SUMMARY

In view of the defects existing in the prior art, the invention is aimed at providing a flexible insulation duct and a modular flexible insulation duct system, with good insulation effect and fire resistance performance.

In the first aspect, the embodiment of the invention provides a flexible insulation duct, comprising a duct main body, which is an annular pipe, wherein the duct main body comprises an inner duct layer and an insulation layer integrally formed on the inner duct layer; the inner duct layer is provided in the insulation layer, and the insulation layer is made of rubber plastic materials.

Based on the first aspect, in a possible embodiment, the outer layer of the insulation layer is provided with an outer insulation layer.

Based on the first aspect, in a possible embodiment, two ends of the duct main body are respectively provided with a first zipper tape connected with other flexible insulation ducts or duct connectors.

Based on the first aspect, in a possible embodiment, the first zipper tape on one end of the duct main body is provided with a first zipper head.

Based on the first aspect, in a possible embodiment, the duct main body is provided with a second zipper for opening or closing the duct main body, the second zipper is longitudinally arranged along the duct main body; when the second zipper is closed, the duct main body is annular; when the second zipper is opened, the duct main body is tabular.

When the flexible insulation duct is tabular, it can be overlapped in the container, with convenient packaging and transportation.

In the second aspect, the embodiment of the invention provides a modular flexible insulation duct system, comprising:

a main duct, one end of which is provided with an air inlet, and the main duct comprises multiple flexible insulation ducts based on the first aspect;

a branch duct extending from the lateral direction of the main duct, the branch duct comprises at least one flexible insulation duct and is connected with the main duct through a connecting duct, and the connecting duct is provided with at least one zipper group, the position of the zipper group is so configured that when all zippers in the zipper group are opened, the connecting duct is divided into multiple flaky pieces.

Based on the second aspect, in a possible embodiment, the connecting duct is a steering duct, a tee duct, a four-way duct, a variable diameter duct, an inlet duct or an outlet duct, which can be connected with the main duct and the branch duct to form an arbitrary structure of the duct system.

Based on the second aspect, in a possible embodiment, the connecting duct is a steering duct, the steering duct is provided with a first connecting pipe, a second connecting pipe and a third connecting pipe successively connected; there is an included angle between the axial direction of the first connecting pipe and the axial direction of the third connecting pipe, the first connecting pipe is connected to the main duct and the third connecting pipe is connected to the branch duct, and the zipper group comprises:

a first zipper group axially arranged along the first connecting pipe, the second connecting pipe and the third connecting pipe; and a second zipper group circumferentially arranged along two ends of the first connecting pipe, the second connecting pipe and the third connecting pipe.

Based on the second aspect, in a possible embodiment, the connecting duct is a tee duct, the tee duct is composed of a third connecting pipe and a fourth connecting pipe, a through hole for connecting the fourth connecting pipe is provided in the middle of the third connecting pipe, and the zipper group comprises:

a third zipper group axially arranged along the third connecting pipe and the fourth connecting pipe; and a fourth zipper group circumferentially arranged along the through hole and two ends of the third connecting pipe and the fourth connecting pipe.

Based on the second aspect, in a possible embodiment, one interface of the tee duct is connected with the main duct, and other two interfaces are respectively connected with a branch duct.

Based on the second aspect, in a possible embodiment, the connecting duct is a four-way duct, the four-way duct is composed of a fifth connecting pipe, a sixth connecting pipe and a seventh connecting pipe, the fifth connecting pipe is symmetrically provided with two through holes, the sixth connecting pipe and the seventh connecting pipe are respectively connected with a through hole, and the zipper group comprises:

a fifth zipper group axially arranged along the fifth connecting pipe, the sixth connecting pipe and the seventh connecting pipe; and a sixth zipper group circumferentially arranged along the through hole and two ends of the fifth connecting pipe, the sixth connecting pipe and the seventh connecting pipe.

Based on the second aspect, in a possible embodiment, two opposite interfaces of the four-way duct are respectively connected with a main duct, and other two opposite interfaces are respectively connected with a branch duct.

Based on the second aspect, in a possible embodiment, the main duct comprises:

a first section close to the air inlet of the main duct, and the first section comprises multiple first flexible insulation ducts; and a second section away from the air inlet of the main duct, and the second section comprises multiple second flexible insulation ducts; and the diameter of the first flexible insulation duct is greater than that of the second flexible insulation duct.

Based on the second aspect, in a possible embodiment, a first four-way duct is connected at the air inlet of the main duct, the first section is connected with the second section through a variable diameter module, and the variable diameter module comprises a second four-way duct and a variable diameter duct connected with each other;

the tail end of the main duct is connected with a tee duct;

the tee duct is composed of a third connecting pipe and a fourth connecting pipe, a through hole for connecting the fourth connecting pipe is provided in the middle of the third connecting pipe, and the zipper group comprises:

a third zipper group axially arranged along the third connecting pipe and the fourth connecting pipe; a fourth zipper group circumferentially arranged along the through hole and two ends of the third connecting pipe and the fourth connecting pipe;

the tee duct is also connected with two branch ducts extending in reverse direction; and both the first four-way duct and the second four-way duct are connected with two branch ducts.

Based on the second aspect, in a possible embodiment, the tail end of the branch duct connected with the first four-way duct or the second four-way duct is also provided with a tee duct, and two sub-branch ducts extending in reverse direction are also connected to the tee duct.

In the third aspect, the embodiment of the invention provides a flexible insulation duct, comprising a duct main body, wherein two ends of the duct main body are respectively provided with a connecting piece in detachable connection with the flexible air supply duct, and the duct main body is provided with an opening and closing mechanism for opening and closing the duct main body;

the duct main body comprises an insulation layer, an inner duct layer is provided on the top of the insulation layer, and an outer insulation layer is provided on the bottom of the insulation layer.

Based on the third aspect, in a possible embodiment, the insulation layer is made of rubber plastic materials.

Based on the third aspect, in a possible embodiment, the opening and closing mechanism is a second zipper, and the second zipper is longitudinally arranged along the duct main body; when the second zipper is closed, the duct main body is annular; when the second zipper is opened, the duct main body is tabular.

Based on the third aspect, in a possible embodiment, the duct main body is provided with a joint extending along the length direction and divided into a first end and a second end through the joint, at least one of the inner surface and the outer surface of the duct main body is provided with a second zipper arranged along the joint, the second zipper is connected with the first end and the second end, and the first end and the second end are extruded with each other at the joint, so that two sides of the joint fit more tightly, and there will be no air leakage.

Based on the third aspect, in a possible embodiment, both the inner surface and outer surface of the duct main body are respectively provided with the second zipper arranged along the joint.

Based on the third aspect, in a possible embodiment, the second zipper comprises a male chain provided at the first end and a female chain provided at the second end, the male chain defines a first installation point on the first end, and the female chain defines a second installation point on the second end; a first distance A is formed between the first installation point and the second installation point under the closing state of the second zipper;

a second distance B is formed between the first installation point and the tail end of the first end under the opening state of the second zipper; a third distance C is formed between the second installation point and the tail end of the second end, wherein the first distance A is slightly less than the sum of the second distance B and the third distance C.

In the fourth aspect, the embodiment of the invention provides a modular flexible insulation duct system, comprising:

a main duct, one end of which is provided with an air inlet, and the main duct comprises multiple flexible insulation ducts based on the third aspect;

a branch duct extending from the lateral direction of the main duct, the branch duct comprises at least one flexible insulation duct and is connected with the main duct through a connecting duct, and the connecting duct is provided with at least one zipper group, the position of the zipper group is so configured that when all zippers in the zipper group are opened, the connecting duct is divided into multiple flaky pieces, with quick on-site installation.

Based on the fourth aspect, in a possible embodiment, the connecting duct is a steering duct, a tee duct, a four-way duct, a variable diameter duct, an inlet duct or an outlet duct, which can be connected with the main duct and the branch duct to form an arbitrary structure of the duct system.

Based on the fourth aspect, in a possible embodiment, the connecting duct is a steering duct, the steering duct is provided with a first connecting pipe, a second connecting pipe and a third connecting pipe successively connected; there is an included angle between the axial direction of the first connecting pipe and the axial direction of the third connecting pipe, the first connecting pipe is connected to the main duct and the third connecting pipe is connected to the branch duct, and the zipper group comprises:

a first zipper group axially arranged along the first connecting pipe, the second connecting pipe and the third connecting pipe; and a second zipper group circumferentially arranged along two ends of the first connecting pipe, the second connecting pipe and the third connecting pipe.

Based on the fourth aspect, in a possible embodiment, the connecting duct is a tee duct, the tee duct is composed of a third connecting pipe and a fourth connecting pipe, a through hole for connecting the fourth connecting pipe is provided in the middle of the third connecting pipe, and the zipper group comprises:

a third zipper group axially arranged along the third connecting pipe and the fourth connecting pipe; and a fourth zipper group circumferentially arranged along the through hole and two ends of the third connecting pipe and the fourth connecting pipe.

Based on the fourth aspect, in a possible embodiment, one interface of the tee duct is connected with the main duct, and other two interfaces are respectively connected with a branch duct.

Based on the fourth aspect, in a possible embodiment, the connecting duct is a four-way duct, the four-way duct is composed of a fifth connecting pipe, a sixth connecting pipe and a seventh connecting pipe, the fifth connecting pipe is symmetrically provided with two through holes, the sixth connecting pipe and the seventh connecting pipe are respectively connected with a through hole, and the zipper group comprises:

a fifth zipper group axially arranged along the fifth connecting pipe, the sixth connecting pipe and the seventh connecting pipe; and a sixth zipper group circumferentially arranged along the through hole and two ends of the fifth connecting pipe, the sixth connecting pipe and the seventh connecting pipe.

Based on the fourth aspect, in a possible embodiment, two opposite interfaces of the four-way duct are respectively connected with a main duct, and other two opposite interfaces are respectively connected with a branch duct.

In the embodiment of the invention, the main duct comprises:

a first section near the air inlet of the main duct, and the first section comprises multiple first flexible insulation ducts;

a second section away from the air inlet of the main duct, and the second section comprises multiple second flexible insulation ducts; and the diameter of the first flexible insulation duct is greater than that of the second flexible insulation duct.

Based on the fourth aspect, in a possible embodiment, a first four-way duct is connected at the air inlet of the main duct, the first section is connected with the second section through a variable diameter module, and the variable diameter module comprises a second four-way duct and a variable diameter duct connected with each other;

the tail end of the main duct is connected with a tee duct;

the tee duct is composed of a third connecting pipe and a fourth connecting pipe, a through hole for connecting the fourth connecting pipe is provided in the middle of the third connecting pipe, and the zipper group comprises:

a third zipper group axially arranged along the third connecting pipe and the fourth connecting pipe; and a fourth zipper group circumferentially arranged along the through hole and two ends of the third connecting pipe and the fourth connecting pipe;

the tee duct is also connected with two branch ducts extending in reverse direction; and both the first four-way duct and the second four-way duct are connected with two branch ducts.

Based on the fourth aspect, in a possible embodiment, the tail end of the branch duct connected with the first four-way duct or the second four-way duct is also provided with a tee duct, and two sub-branch ducts extending in reverse direction are also connected to the tee duct.

Compared with the prior art, the invention has the advantages as follows:

The invention provides a flexible insulation duct, which is composed of an inner duct layer and an insulation layer by integrating. Compared with traditional duct, it has better heat preservation performance, fire resistance and air leakage prevention performance. When the flexible insulation duct is tabular, it can be overlapped in the pallet container and other equipment, with convenient packaging and transportation. The modular flexible insulation duct system assembled from the main duct, the branch duct and the connecting duct can be quickly connected with zipper in the field to become any structure of the duct system, with fast site assembly and disassembly, saving construction time and reducing construction cost, and it has a very broad application prospect.

DETAILED DESCRIPTION OF THE EMBODIMENTS

A more detailed description is given below combined with the figures and embodiments.

Embodiment 1

Figure 3:
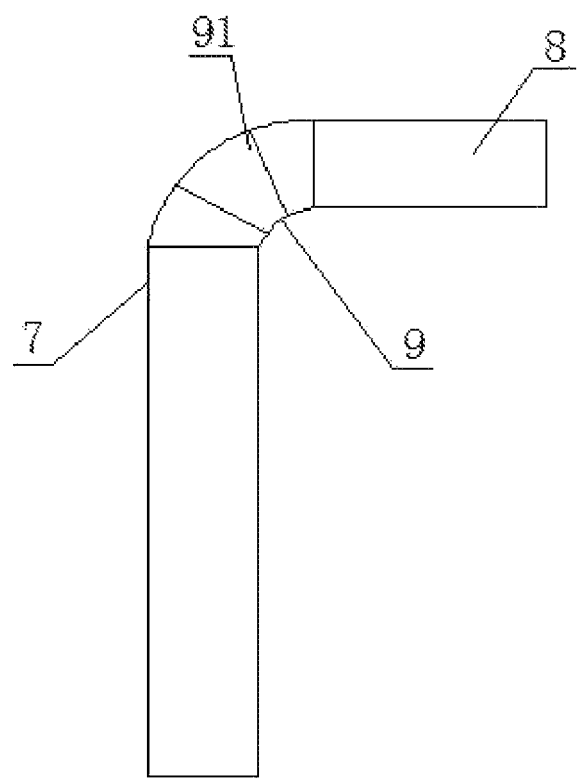
FIG. 3 shows a schematic diagram of the modular flexible insulation duct system in Embodiment 1 of the invention.

The embodiment of the invention provides a modular flexible insulation duct system, as shown in FIG. 3, which comprises the main duct 7, a branch duct 8 extending laterally from the main duct 7, and a connecting duct 9. One end of the main duct 7 is provided with an air inlet 70, and the main duct 7 comprises multiple flexible insulation ducts, the branch duct 8 comprises at least one flexible insulation duct and is connected with the main duct 7 through a connecting duct 9, meanwhile the connecting duct 9 is provided with at least one zipper group, the position of the zipper group is so configured that when all zippers in the zipper group are opened, the connecting duct 9 is divided into multiple flaky pieces for rapid assembling. The main duct 7, the branch duct 8 and the connecting duct 9 can be decomposed into a variety of modular standard sizes for large-scale batch production.

Figure 1:
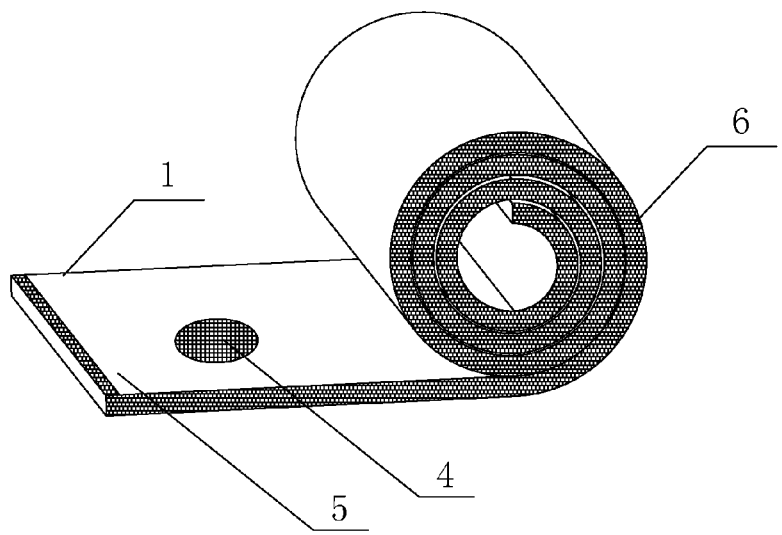
FIG. 1 shows a schematic diagram of the flexible insulation duct in Embodiment 1 of the invention.

As shown in FIG. 1, the flexible insulation duct comprises a duct main body 1, which is an annular pipe, wherein the duct main body 1 comprises an inner duct layer 5 and an insulation layer 4 integrally formed on the inner duct layer 5; the inner duct layer 5 is provided in the insulation layer 4, and the insulation layer 4 is made of rubber plastic materials. The insulation layer 4 is integrated onto the inner duct layer 5 to form the annular duct main body 1, so that the duct main body 1 has both the fire resistance of the inner duct layer 5 and the insulation effect of the insulation layer 4.

In order to further strengthen the insulation and damage prevention of the duct main body, the outer layer of the insulation layer 4 is provided with an outer insulation layer 6.

Figure 2:
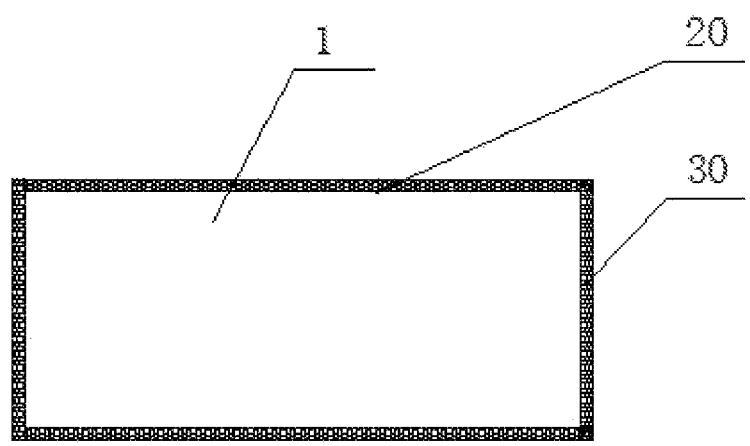
FIG. 2 shows a schematic diagram of the unfolding duct main body in Embodiment 1 of the invention.

As shown in FIG. 2, two ends of the duct main body 1 are respectively provided with a first zipper tape 20 connected with other flexible insulation ducts or duct connectors. The first zipper tape 20 on one end of the duct main body 1 is provided with a first zipper head, so that two ends of the duct main body 1 are connected with other flexible insulation ducts or duct connectors. The duct main body 1 is provided with a second zipper 30 for opening or closing the duct main body 1, the second zipper 30 is longitudinally arranged along the duct main body 1; when the second zipper 30 is closed, the duct main body 1 is annular; when the second zipper 30 is opened, the duct main body 1 is tabular. During the transportation, it just needs to open the second zipper 30 to form a tabular duct main body, and then it can be overlapped in the pallet container and other equipment, with convenient packaging and transportation.

Embodiment 2

Figure 4:
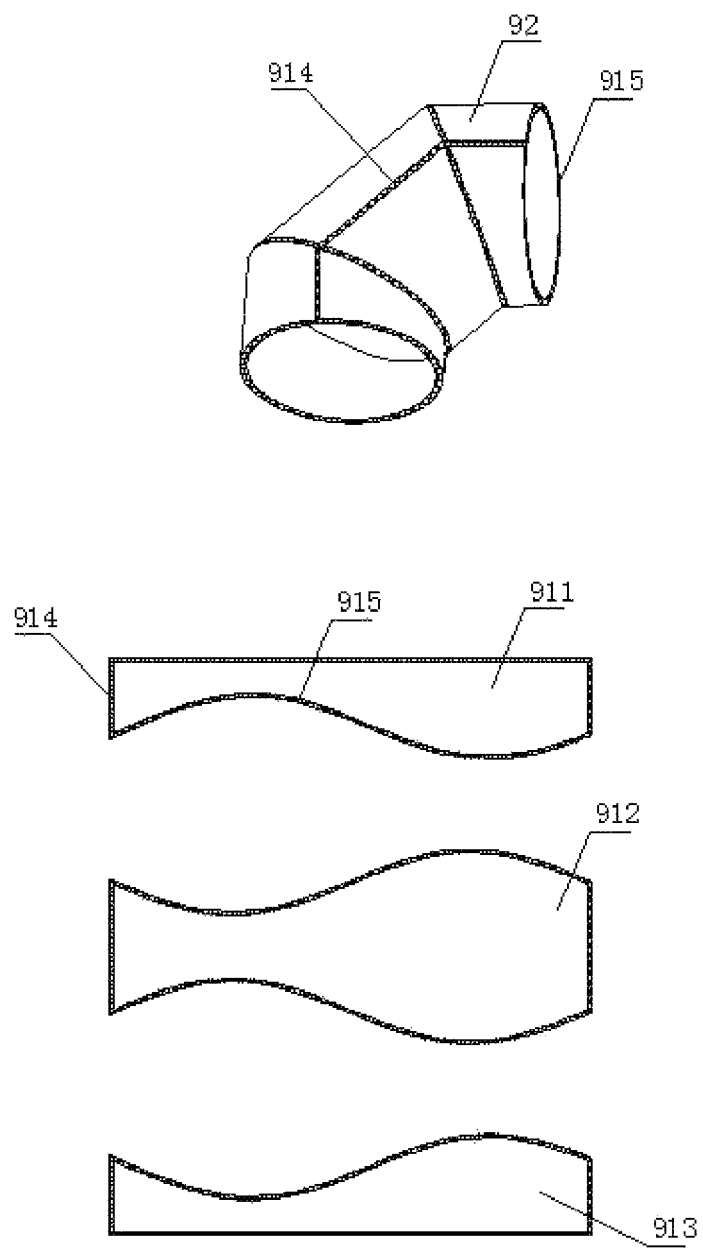
FIG. 4 shows a schematic diagram of the steering duct in Embodiment 2 of the invention.

The embodiment of the invention provides a modular flexible insulation duct system. The difference is that the connecting duct 9 in the embodiment of the invention is a steering duct 91, as shown in FIG. 4, the steering duct 91 is provided with a first connecting pipe 911, a second connecting pipe 912 and a third connecting pipe 913 successively connected; there is an included angle between the axial direction of the first connecting pipe 911 and the axial direction of the third connecting pipe 913, the first connecting pipe 911 is connected to the main duct 7 and the third connecting pipe 913 is connected to the branch duct 8, and the zipper group comprises a first zipper group 914 and a second zipper group 915, the first zipper group 914 is axially arranged along the first connecting pipe 911, the second connecting pipe 912 and the third connecting pipe 913; and the second zipper group 915 is circumferentially arranged along two ends of the first connecting pipe 911, the second connecting pipe 912 and the third connecting pipe 913.

According to different application environments of flexible duct system, the air outlet mode of flexible insulation duct is also different. A downward ventilation vent can be provided in the duct main body 1, or a ventilation hole can be provided on the duct main body 1.

Embodiment 3

Figure 5:
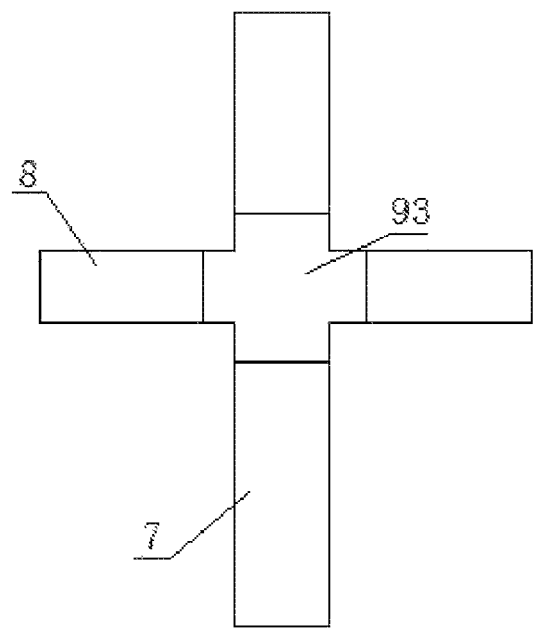
FIG. 5 shows a schematic diagram of the modular flexible insulation duct system in Embodiment 3 of the invention.

As shown in FIG. 5, the embodiment of the invention provides a modular flexible insulation duct system. The difference from the Embodiment 2 is that the connecting duct 9 is a four-way duct 93, the four-way duct 93 is composed of a fifth connecting pipe, a sixth connecting pipe and a seventh connecting pipe, the fifth connecting pipe is symmetrically provided with two through holes, the sixth connecting pipe and the seventh connecting pipe are respectively connected with a through hole, and the zipper group comprises a fifth zipper group and a sixth zipper group, the fifth zipper group is axially arranged along the fifth connecting pipe, the sixth connecting pipe and the seventh connecting pipe; and the sixth zipper group is circumferentially arranged along the through hole and two ends of the fifth connecting pipe, the sixth connecting pipe and the seventh connecting pipe. Two opposite interfaces of the four-way duct 93 are respectively connected with a main duct 7, and other two opposite interfaces are respectively connected with a branch duct 8.

Embodiment 4

The embodiment of the invention provides a modular flexible insulation duct system, which comprises the main duct 7, a branch duct 8 extending laterally from the main duct 7, and a connecting duct 9. One end of the main duct 7 is provided with an air inlet 70, and the main duct 7 comprises multiple flexible insulation ducts, the branch duct 8 comprises at least one flexible insulation duct and is connected with the main duct 7 through a connecting duct 9, meanwhile the connecting duct 9 is provided with at least one zipper group, the position of the zipper group is so configured that when all zippers in the zipper group are opened, the connecting duct 9 is divided into multiple flaky pieces for rapid assembling. The main duct 7, the branch duct 8 and the connecting duct 9 can be decomposed into a variety of modular standard sizes for large-scale batch production.

In order not to be restricted by the space of the project site and reduce the customization of various length specifications, flexible insulation duct with the same diameter are provided with various length specifications, which can be spliced into pipes of any length. When the assembled main duct 7 or branch duct 8 has size deviation, flexible insulation duct can also be rapidly added or reduced to adjust the length of main duct 7 or branch duct 8 to accurately meet the actual size of the site, so as to ensure that the main air duct 7 or the branch air duct 8 is in straight state during air supply, and avoid the sag of the main duct 7 or branch duct 8, which will affect the effect and aesthetics of air supply.

The connecting duct 9 is a steering duct 91, a tee duct 92, a four-way duct 93, a variable diameter duct 94, an inlet duct or an outlet duct, and it can be customized according to the actual needs of the site, and can be quickly assembled into any structure of the pipe.

Figure 6:
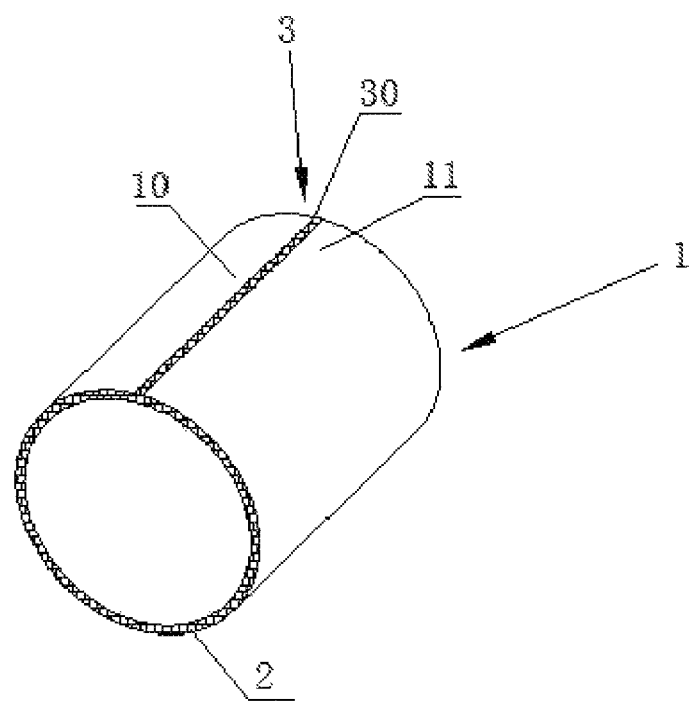
FIG. 6 shows a schematic diagram of the flexible insulation duct in Embodiment 4 of the invention.

As shown in FIG. 6, the flexible insulation duct comprises a duct main body 1, wherein two ends of the duct main body 1 are respectively provided with a connecting piece 2 in detachable connection with the flexible air supply duct, and the duct main body 1 is provided with an opening and closing mechanism 3 for opening and closing the duct main body 1.

In the embodiment, the opening and closing mechanism 3 is a second zipper 30, and the second zipper 30 is longitudinally arranged along the duct main body 1; when the second zipper 30 is closed, the duct main body 1 is annular; when the second zipper 30 is opened, the duct main body 1 is tabular, and it can be overlapped in the container, with convenient packaging and transportation.

the duct main body 1 is provided with a joint extending along the length direction and divided into a first end 10 and a second end 11 through the joint, at least one of the inner surface and the outer surface of the duct main body 1 is provided with a second zipper 30 arranged along the joint, the second zipper 30 is connected with the first end 10 and the second end 11, and the first end 10 and the second end 11 are extruded with each other at the joint. Due to the effect of extruding with each other at the joint, both sides of the joint fit more tightly, which solves the problem of air leakage of the duct main body 1 at the joint, reduces the load of the fan, and ensures the service life of duct main body 1.

Figure 7:
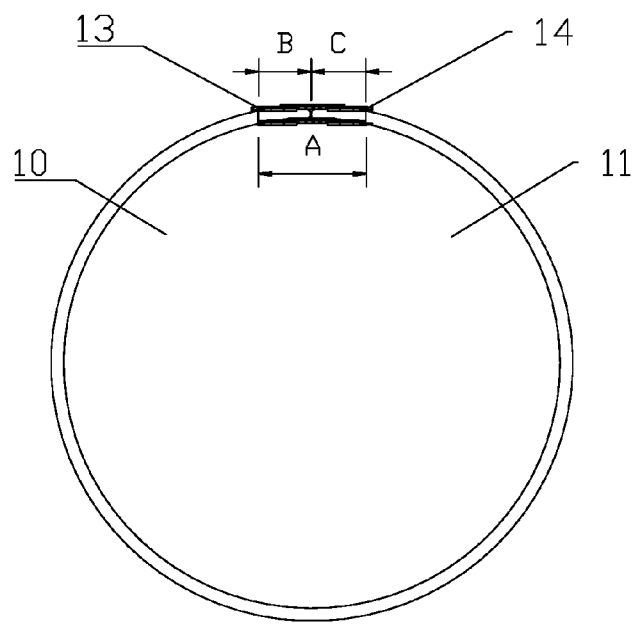
FIG. 7 shows a section diagram of the flexible insulation duct in Embodiment 4 of the invention.

As shown in FIG. 7, both the inner surface and outer surface of the duct main body 1 are respectively provided with the second zipper 30 arranged along the joint. The second zipper 30 comprises a male chain provided at the first end 10 and a female chain provided at the second end 11, the male chain defines a first installation point 13 on the first end 10, and the female chain defines a second installation point 14 on the second end 11; a first distance A is formed between the first installation point 13 and the second installation point 14 under the closing state of the second zipper 30; a second distance B is formed between the first installation point 13 and the tail end of the first end 10 under the opening state of the second zipper 30; a third distance C is formed between the second installation point 14 and the tail end of the second end 11, wherein the first distance A is slightly smaller than the sum of the second distance B and the third distance C. However, the second distance B and the third distance C are not limited, but it is preferred that the second distance B is equal to the third distance C; here, the first distance A is slightly smaller, it means to make the first end 10 and the second end 11 extruded with each other, but it will not be too small to make the zipper unable to close.

As shown in FIG. 1, the duct main body 1 comprises an insulation layer 4, an inner duct layer 5 is provided on the top of the insulation layer 4, and an outer insulation layer 6 is provided on the bottom of the insulation layer 4. In addition to overlaying the duct main body 1 in the container, it can also be folded longitudinally from the connector at one end of the duct main body 1. The duct main body 1 has no gaps left in each circle during folding, and the volume is small after folding, which is convenient for transportation and storage. In addition, after folding, the inner duct layer 5 and outer insulation layer 6 have no folds and will not be separated from the insulation layer 4, wherein the insulation layer 4 is made of rubber plastic materials.

Embodiment 5

The embodiment of the invention provides a modular flexible insulation duct system, as shown in FIG. 3 and FIG. 4. The difference is that the connecting duct 9 in the embodiment of the invention is a steering duct 91, the steering duct 91 is provided with a first connecting pipe 911, a second connecting pipe 912 and a third connecting pipe 913 successively connected; there is an included angle between the axial direction of the first connecting pipe 911 and the axial direction of the third connecting pipe 913, the first connecting pipe 911 is connected to the main duct 7 and the third connecting pipe 913 is connected to the branch duct 8, and the zipper group comprises a first zipper group 914 and a second zipper group 915, the first zipper group 914 is axially arranged along the first connecting pipe 911, the second connecting pipe 912 and the third connecting pipe 913; and the second zipper group 915 is circumferentially arranged along two ends of the first connecting pipe 911, the second connecting pipe 912 and the third connecting pipe 913.

Embodiment 6

Figure 8:
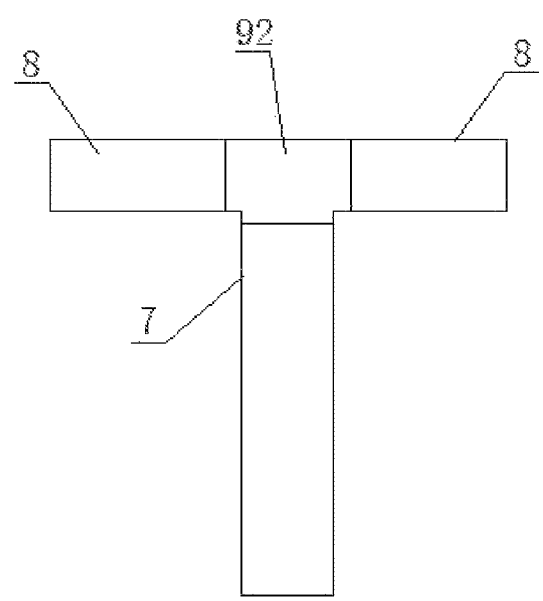
FIG. 8 shows a schematic diagram of the modular flexible insulation duct system in Embodiment 6 of the invention.
Figure 9:
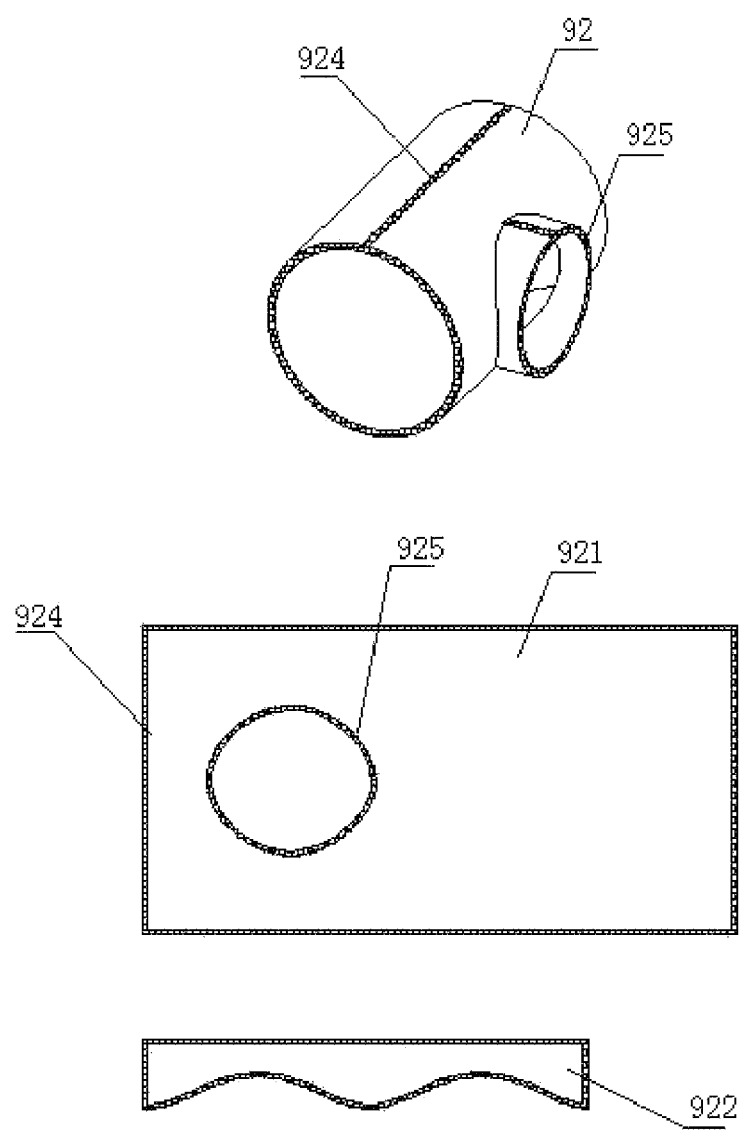
FIG. 9 shows a schematic diagram of the tee duct in Embodiment 6 of the invention.

As shown in FIG. 8 and FIG. 9, the embodiment of the invention provides a modular flexible insulation duct system. The difference from the Embodiment 5 is that the connecting duct 9 is a tee duct 92, the tee duct 92 is composed of a third connecting pipe 921 and a fourth connecting pipe 922, a through hole for connecting the fourth connecting pipe 922 is provided in the middle of the third connecting pipe 921, and the zipper group comprises a third zipper group 924 and a fourth zipper group 925, the third zipper group 924 is axially arranged along the third connecting pipe 921 and the fourth connecting pipe 922; and the fourth zipper group 925 is circumferentially arranged along the through hole and two ends of the third connecting pipe 921 and the fourth connecting pipe 922. In the embodiment, one interface of the tee duct 92 is connected with the main duct 7, and other two interfaces are respectively connected with a branch duct 8.

Embodiment 7

Figure 10:
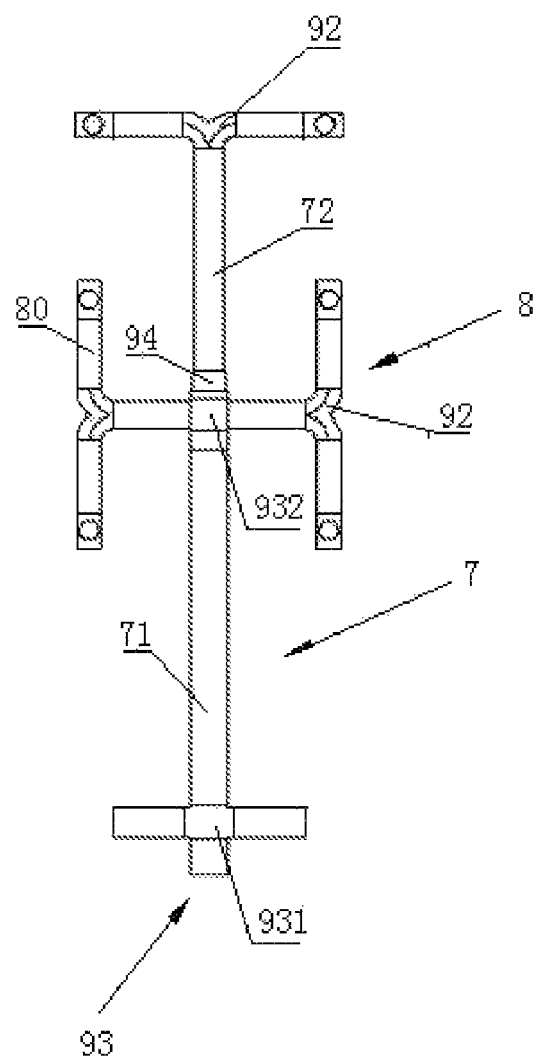
FIG. 10 shows a schematic diagram of the modular flexible insulation duct system in Embodiment 7 of the invention.

As shown in FIG. 10, the embodiment of the invention provides a modular flexible insulation duct system. The difference from the Embodiment 5 or Embodiment 6 is that the connecting duct 9 is a four-way duct 93, the four-way duct 93 is composed of a fifth connecting pipe, a sixth connecting pipe and a seventh connecting pipe, the fifth connecting pipe is symmetrically provided with two through holes, the sixth connecting pipe and the seventh connecting pipe are respectively connected with a through hole, and the zipper group comprises a fifth zipper group and a sixth zipper group, the fifth zipper group is axially arranged along the fifth connecting pipe, the sixth connecting pipe and the seventh connecting pipe; and the sixth zipper group is circumferentially arranged along the through hole and two ends of the fifth connecting pipe, the six connecting pipe and the seventh connecting pipe.

In the embodiment, the main duct 7 comprises a first section 71 near the air inlet of the main duct 7 and a second section 72 away from the air inlet of the main duct 7, wherein the first section 71 comprises multiple first flexible insulation ducts, and the second section 72 comprises multiple second flexible insulation ducts; meanwhile the diameter of the first flexible insulation duct is greater than that of the second flexible insulation duct to adapt to the change of wind pressure. According to the actual requirements on the site, multiple first flexible insulation ducts can be spliced into the first section 71 with the required length, and multiple second flexible insulation ducts can be spliced into the second segment 72 with the required length.

A first four-way duct 931 is connected at the air inlet of the main duct 7, the first section 71 is connected with the second section 72 through a variable diameter module, and the variable diameter module comprises a second four-way duct 932 and a variable diameter duct 94 connected with each other. A large-diameter end of the variable diameter duct 94 is connected with the second four-way duct 932, and a small-diameter end thereof is connected with the second section 72.

The tail end of the main duct 7 is connected with a tee duct 92. As shown in FIG. 9, the tee duct 92 is composed of a third connecting pipe 921 and a fourth connecting pipe 922, a through hole for connecting the fourth connecting pipe 922 is provided in the middle of the third connecting pipe 921, and the zipper group comprises a third zipper group 924 and a fourth zipper group 925, the third zipper group 924 is axially arranged along the third connecting pipe 921 and the fourth connecting pipe 922; and the fourth zipper group 925 is circumferentially arranged along the through hole and two ends of the third connecting pipe 921 and the fourth connecting pipe 922.

In the embodiment, the tee duct 92 is also connected with two branch ducts (8) extending in reverse direction, and both the first four-way duct 931 and the second four-way duct 932 are connected with two branch ducts 8. The tail end of the branch duct 8 connected with the second four-way duct 932 is also provided with a tee duct 92, and two sub-branch ducts 80 extending in reverse direction are also connected to the tee duct 92.

Embodiment 8

Figure 11:
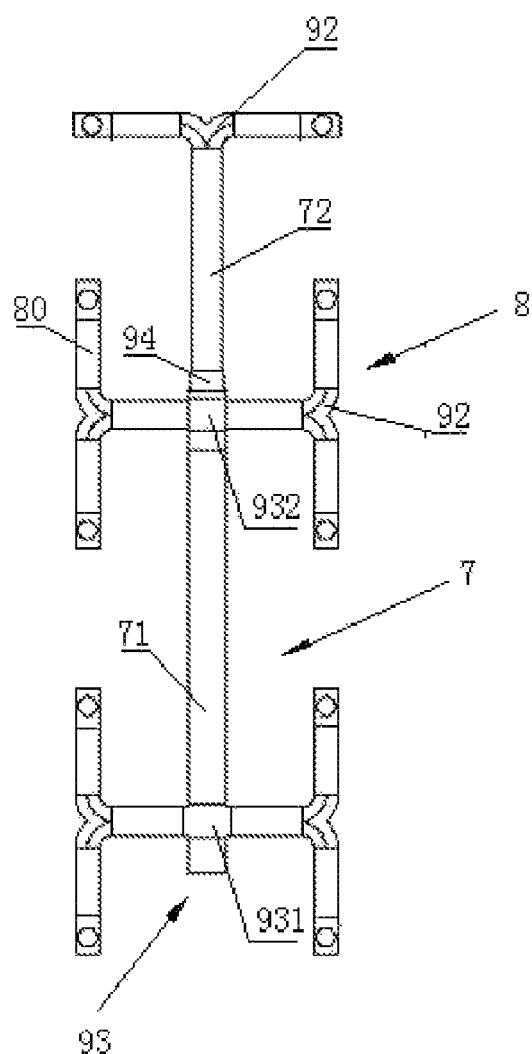
FIG. 11 shows a schematic diagram of the modular flexible insulation duct system in Embodiment 8 of the invention.
Figure 12:
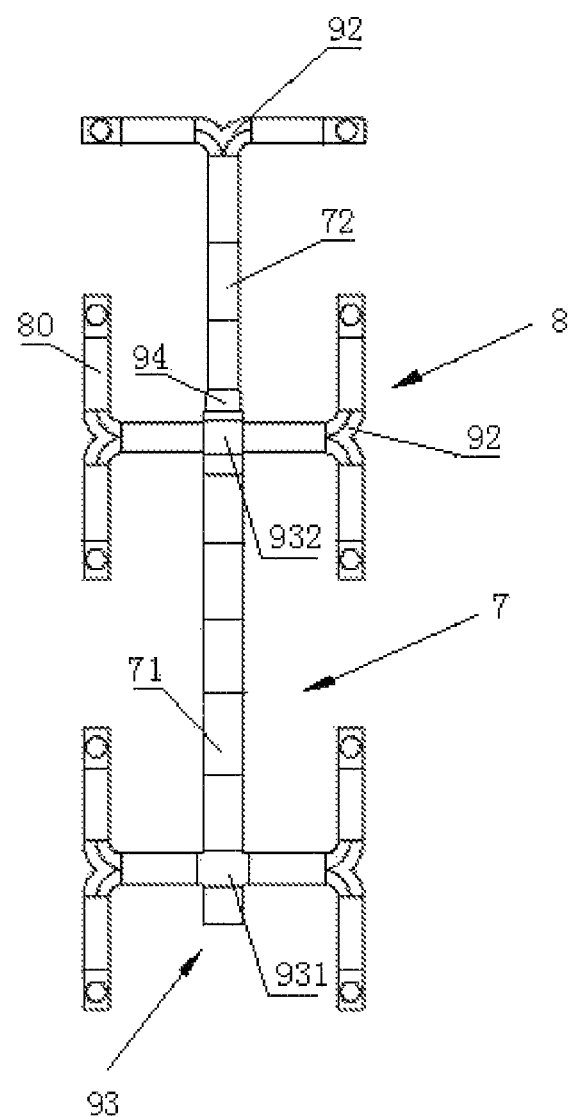
FIG. 12 shows a schematic diagram of breakdown of the modular flexible insulation duct system in Embodiment 8 of the invention.

As shown in FIG. 11 and FIG. 12, the embodiment of the invention provides a modular flexible insulation duct system. The difference from the Embodiment 7 is that both tail ends of the branch duct 8 connected with the first four-way duct 931 and the branch duct 8 connected with the second four-way duct 932 are provided with a tee duct 92, and two sub-branch ducts 80 extending in reverse direction are also connected to the tee duct 92.

In the use of the modular flexible duct insulation system in the embodiment, according to the actual situation of the application site, flexible insulation duct can be produced in advance in the factory, and the parts to be assembled will be numbered in order, which is convenient for construction personnel to realize direct modular and rapid assembling according to the number on site, so as to greatly improve the engineering efficiency and shorten the construction period.

The invention is not limited to the best embodiments mentioned above.

Any person may derive other forms of products from the inspiration of the invention, but any technical solution identical or similar to the invention, regardless of any change in its shape or structure, shall be within its protection scope.

The invention claimed is:

1. A flexible insulation duct, comprising a duct main body (1), wherein two ends of the duct main body (1) are respectively provided with a connecting piece (2) in detachable connection with a flexible air supply duct, and the duct main body (1) is provided with an opening and closing mechanism (3) for opening and closing the duct main body (1);

the duct main body (1) comprises an insulation layer (4), an inner duct layer (5) is provided on the top of the insulation layer (4), and an outer insulation layer (6) is provided on the bottom of the insulation layer (4);

the duct main body (1) is provided with a joint extending along the length direction and divided into a first end (10) and a second end (11) through the joint, at least one of the inner surface and the outer surface of the duct main body (1) is provided with a zipper (30) arranged along the joint, the zipper (30) is connected with the first end (10) and the second end (11), and the first end (10) and the second end (11) are extruded with each other at the joint.

2. The flexible insulation duct according to claim 1, wherein the insulation layer (4) is made of rubber plastic materials.

3. The flexible insulation duct according to claim 1, wherein the zipper (30) is longitudinally arranged along the duct main body (1); when the zipper (30) is closed, the duct main body (1) is annular; when the zipper (30) is opened, the duct main body (1) is tabular.

4. The flexible insulation duct according to claim 1, wherein both the inner surface and outer surface of the duct main body (1) are respectively provided with the zipper (30) arranged along the joint.

5. The flexible insulation duct according to claim 4, wherein the zipper (30) comprises a male chain provided at the first end (10) and a female chain provided at the second end (11), the male chain defines a first installation point (13) on the first end (10), and the female chain defines a second installation point (14) on the second end (11); a first distance (A) is formed between the first installation point (13) and the second installation point (14) under the closing state of the zipper (30);

a second distance (B) is formed between the first installation point (13) and the tail end of the first end (10) under the opening state of the zipper (30); a third distance (C) is formed between the second installation point (14) and the tail end of the second end (11), wherein the first distance (A) is slightly less than the sum of the second distance (B) and the third distance (C).

6. A modular flexible insulation duct system, comprising:

a main duct (7), one end of which is provided with an air inlet (70), and the main duct (7) comprises multiple flexible insulation ducts according to claim 1;

a branch duct (8) extending from the lateral direction of the main duct (7), the branch duct (8) comprises at least one flexible insulation duct and is connected with the main duct (7) through a connecting duct (9), and the connecting duct (9) is provided with at least one zipper group, the position of the zipper group is so configured that when all zippers in the zipper group are opened, the connecting duct (9) is divided into multiple flaky pieces.

7. The modular flexible insulation duct system according to claim 6, wherein the connecting duct (9) is a steering duct (91), the steering duct (91) is provided with a first connecting pipe, a second connecting pipe and a third connecting pipe successively connected; there is an included angle between the axial direction of the first connecting pipe and the axial direction of the third connecting pipe, the first connecting pipe is connected to the main duct (7) and the third connecting pipe is connected to the branch duct (8), and the zipper group comprises:

a first zipper group (914) axially arranged along the first connecting pipe, the second connecting pipe and the third connecting pipe; and a second zipper group (915) circumferentially arranged along two ends of the first connecting pipe, the second connecting pipe and the third connecting pipe.

8. The modular flexible insulation duct system according to claim 6, wherein the connecting duct (9) is a tee duct (92), the tee duct (92) is composed of a third connecting pipe and a fourth connecting pipe, a through hole for connecting the fourth connecting pipe is provided in the middle of the third connecting pipe, and the zipper group comprises:

a third zipper group (924) axially arranged along the third connecting pipe and the fourth connecting pipe;

a fourth zipper group (925) circumferentially arranged along the through hole and two ends of the third connecting pipe and the fourth connecting pipe.

9. The modular flexible insulation duct system according to claim 8, wherein one interface of the tee duct (92) is connected with the main duct (7), and other two interfaces are respectively connected with a branch duct (8).

10. The modular flexible insulation duct system according to claim 6, wherein the connecting duct (9) is a four-way duct (93), the four-way duct (93) is composed of a fifth connecting pipe, a sixth connecting pipe and a seventh connecting pipe, the fifth connecting pipe is symmetrically provided with two through holes, the sixth connecting pipe and the seventh connecting pipe are respectively connected with a through hole, and the zipper group comprises:
- a fifth zipper group axially arranged along the fifth connecting pipe, the sixth connecting pipe and the seventh connecting pipe; and
- a sixth zipper group circumferentially arranged along the through hole and two ends of the fifth connecting pipe, the sixth connecting pipe and the seventh connecting pipe.

11. The modular flexible insulation duct system according to claim 10, wherein the main duct (7) comprises:
- a first section (71) close to the air inlet of the main duct (7), and the first section (71) comprises multiple first flexible insulation ducts;
- a second section (72) away from the air inlet of the main duct (7), and the second section (72) comprises multiple second flexible insulation ducts; and
- the diameter of the first flexible insulation duct is greater than that of the second flexible insulation duct.

12. The modular flexible insulation duct system according to claim 11, wherein a first four-way duct (931) is connected at the air inlet of the main duct (7), the first section (71) is connected with the second section (72) through a variable diameter module, and the variable diameter module comprises a second four-way duct (932) and a variable diameter duct (94) connected with each other;
- the tail end of the main duct (7) is connected with a tee duct (92);
- the tee duct (92) is composed of a third connecting pipe and a fourth connecting pipe, a through hole for connecting the fourth connecting pipe is provided in the middle of the third connecting pipe, and the zipper group comprises:
  - a third zipper group (924) axially arranged along the third connecting pipe and the fourth connecting pipe;
  - a fourth zipper group (925) circumferentially arranged along the through hole and two ends of the third connecting pipe and the fourth connecting pipe;
- the tee duct (92) is also connected with two branch ducts (8) extending in reverse direction; and
- both the first four-way duct (931) and the second four-way duct (932) are connected with two branch ducts (8).

13. The modular flexible insulation duct system according to claim 12, wherein the tail end of the branch duct (8) connected with the first four-way duct (931) or the second four-way duct (932) is also provided with a tee duct (92), and two sub-branch ducts (80) extending in reverse direction are also connected to the tee duct (92).

\* \* \* \* \*